(12) United States Patent
Basu et al.

(10) Patent No.: US 6,836,888 B1
(45) Date of Patent: Dec. 28, 2004

(54) SYSTEM FOR REVERSE SANDBOXING

(75) Inventors: Anindya Basu, New York, NY (US); Suvo Mittra, Bedminster, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/528,381

(22) Filed: Mar. 17, 2000

(51) Int. Cl.[7] .............................. G06F 9/46; H04L 9/00
(52) U.S. Cl. ....................... 718/104; 718/100; 718/102; 713/164; 713/200
(58) Field of Search ................... 713/160–161, 713/164–165, 187, 200–202; 718/1, 100, 102–108; 717/114, 116–118; 709/1, 100, 102–108

(56) References Cited

U.S. PATENT DOCUMENTS

| | | | | |
|---|---|---|---|---|
| 5,218,699 A | * | 6/1993 | Brandle et al. ............. | 709/328 |
| 5,414,833 A | * | 5/1995 | Hershey et al. ............. | 713/201 |
| 6,052,720 A | * | 4/2000 | Traversat et al. ........... | 709/220 |
| 6,141,677 A | * | 10/2000 | Hanif et al. ................ | 709/100 |
| 6,212,608 B1 | * | 4/2001 | Bak ........................... | 711/152 |
| 6,275,938 B1 | * | 8/2001 | Bond et al. .................. | 713/200 |
| 6,351,816 B1 | * | 2/2002 | Mueller et al. ............. | 713/201 |
| 6,466,559 B1 | * | 10/2002 | Johansson et al. .......... | 370/335 |
| 6,468,160 B2 | * | 10/2002 | Eliott .......................... | 463/43 |
| 6,510,460 B1 | * | 1/2003 | Callsen et al. .............. | 709/223 |
| 6,542,920 B1 | * | 4/2003 | Belkin et al. ................ | 718/104 |
| 6,546,425 B1 | * | 4/2003 | Hanson et al. .............. | 709/227 |
| 6,560,217 B1 | * | 5/2003 | Pierce, Jr. et al. .......... | 370/351 |
| 6,598,083 B1 | * | 7/2003 | Remer et al. ............... | 709/229 |
| 6,601,112 B1 | * | 7/2003 | O'Rourke et al. .......... | 709/312 |

OTHER PUBLICATIONS

IBM Technical Disclosure Bulletin, vol. 34 Issue 9. "Single System Image and Load Balancing for Network Access to a Loosely Coupled Complex", Feb. 1992, pp. 464–467.*
J. D. Tygar, et al., Strongbox: A System for Self–Securing Programs. In R. Rashid, editor, Carnegie Mellon Computer Science: A 25–Year Commemorative, ACM Press, New York, 1991.

* cited by examiner

Primary Examiner—Meng-Al T. An
Assistant Examiner—Syed Ali

(57) ABSTRACT

A reverse sandbox extends a private computing environment onto a standalone host in a public environment. The reverse sandbox includes a service director that receives service requests, classifies the service requests in accordance with security policies, selects a processing stack based on the classification and communicates the service request to the selected processing stack. A reverse sandbox embodiment may also include a compliance supervisor that constructs processing stacks with mediation modules based upon security policies. The mediation modules of the selected processing stack modify the service request and provide the modified service request to the resources of the standalone host.

34 Claims, 3 Drawing Sheets

I — INTERLOPER
HW — HARWARE
OS — OPERATING SYSTEM
AU — ADMINISTRATIVE USER
VM — VIRTUAL MEMORY
S — STORAGE
C — COMMUNICATION

I — INTERLOPER
HW — HARWARE
OS — OPERATING SYSTEM
AU — ADMINISTRATIVE USER
VM — VIRTUAL MEMORY
S — STORAGE
C — COMMUNICATION

SYSTEM FOR REVERSE SANDBOXING

BACKGROUND OF THE INVENTION

This invention relates to a secure computing environment within a standalone host computer on a virtual private network.

A computing environment is a collection of processes that can interact with each other and access each other's resources without going through a gatekeeper. A gatekeeper is an entity or device that controls the flow of information through it according to some specific policy. A "firewall" is an example of a gatekeeper.

A virtual private network (VPN) is a logical overlay of a private network on top of another public network. Broadly speaking, there are two types of virtual private networks. The first type of virtual private network operates between two or more private networks. An example of this first type is a virtual private network that connects a branch office network to a corporate headquarters network. This type of virtual private network is known as a network-to-network virtual private network. A second type of virtual private network connects a host computer to a private network. An example of this second type is a virtual private network that connects a telecommuter's home computer to his employer's corporate network. The second type of network is known as a host-to-network virtual private network.

Currently, virtual private networks of both types employ cryptographic security measures in the communications link between the remote network or host and the other network. For virtual private networks of the first type, this is typically sufficient in order to ensure a secure virtual private network because each of the networks connected by the virtual private network forms a computing environment that is secured by means of one or more restrictive gatekeepers. That is, A host in each of the private networks is placed behind a firewall, which provides a first level of defense against hackers in a public network.

A host inside a private network may be professionally monitored by a security staff, and such a staff may be trained to recognize and remedy security breaks.

A host within a private network may also be subject to restrictions regarding modifications and/or additions to the software on the host.

A host within a private network may also be subject to restrictions regarding the people who are able to access the host. At a minimum, physical security measures maintained by the organization will restrict the universe of possible users to persons who have access to the building in which the host is located.

In the case of a host-to-network virtual private network, extra measures are required because none of the above-mentioned restrictions are found in a typical host, such as a PC at the home of an employee. Moreover, while the host connects to a private network and becomes part of the host-to-network virtual private network, it continues to exist in an insecure environment through direct links to the Internet. Consequently, such a host—being a part of and within the virtual private network—potentially exposes the to entire private network to an attack that bypasses the firewall or other gatekeepers.

Another danger is that a host that is connected to a private network may also be connected to another private network at the same time, allowing that host computer to concur-rently belong to both private networks. Clearly, this is not a desirable situation, particularly if the two networks belong to competing organizations.

The general problem of protecting a computing environment is obviously not new. Multiple protection mechanisms have been proposed in the past based on programming languages, operating system constructs, security protocols, and so on. Most of this work concerns protecting two peer environments from each other. More recently, there has been a great deal of interest in sandboxing in which a secure computing environment is protected against imported elements.

Other work includes protection of mobile code, which is code that roams a network independently. A problem with mobile code involves ensuring the security of the mobile code as it executes on untrusted network elements. A number of solutions have been proposed to ensure security. These include: cryptographic mechanisms that encrypt computation, redundant computation using fault-tolerance mechanisms, and logging. These techniques are well suited to mobile code applications where there can be no trust placed in the remote environment. However, they are unduly costly and restrictive in cases where a remote environment can be trusted to some extent, e.g., when the remote environment is an employee's home computer.

The work on electronic intellectual property protection, also utilizes some similar mechanisms. For example, The InterTrust DigiBox architecture described in A Self-Protecting Container For Electronic Commerce, In Proceedings of First USENIX Electronic Commerce Workshop, by Sibert et al., July 1995, is a system that securely exports electronic information to prevent misuse of the information. The work on electronic copy protection is focused on securely exporting passive documents.

A number of systems have proposed using wrappers to protect applications. The StrongBox system, described by B. S. Yee in "A Sanctuary for Mobile Agents," Technical Report CS97-537, University of California at San Diego, La Jolla, Calif., April 1997, represents an early approach that focuses on the security of client-server systems in which both the client and server might be running on untrusted machines. More recently, a system that uses software wrappers to secure off-the-shelf applications running in unsafe environments is described in *Hardening COTS Software with Generic Software Wrappers*, by Fraser et al., in Proceedings of the 1999 IEEE Symposium on Security and Privacy, May 1999. This work, however, is targeted at the problem of "hardening" individual applications and not on securing whole environments.

Finally, there has been a lot of work on secure operating systems. The earliest related work is the classic report by James Anderson in 1972 in Technical Report ESD-TR-73-51, Electronics Systems Division entitled *Computer Security Technology Planning Study* that introduced reference monitors. Reference monitors ensure that all access to system resources are authorized and can be implemented in software and/or hardware. Other secure operating systems include: *SCOMP: A Solution to the Multilevel Security Problem*, by Fraim, in Computer 16(7):26–34, 1983; *LOCK Trek: Navigating Unchartered Space*, by Saydjar:, et al. in Proceedings of the 1989 IEEE Computer Society Symposium on Research in Security and Privacy, pp. 167–175, VAX VMM described in *A Retrospective on VAX VMM Security Kernel*, by Karger et al., In IEEE Transactions on Software Engineering 17(11): 1147–1165, 1991; and Trusted Mach described in *Access Mediation in a Message Passing Kernel*, by Branstad et al., In Proceedings of the IEEE Computer Society Symposium on Security and Privacy, pp. 66–72, 1989. The SCOMP and LOCK architectures use a separate security processor for reference validation. The VAX VMM system uses virtual machines that are described in *Survey of Virtual Machine Research*, by Golderg, IEEE Computer Magazine 7(a): 34–45, June 1974, to provide multilevel security and access control. Lastly, the Trusted Mach kernel enforces Bell-LaPadula security that is described in *Secure Computer System: Unified Exposition and Multics Interpretation*, by Bell et al., Technical Report MTR-2997 Rev. 1 AD A023 588, The Mitre Corp., 1976 using a kernel and trusted servers.

SUMMARY OF THE INVENTION

It will be readily apparent from the above, that a need exists in the art for providing additional security to a standalone host. This need is satisfied, and an advance in the art is achieved, with an arrangement that creates a secure computing environment in a host computer. The created "reverse sandbox" computing environment is considered a safe area that is protected from attacks originating outside the safe area. The reverse sandbox technique extends a private computing environment such as a private network into a public environment such as a standalone PC accessible by everyone. Reverse sandboxing is effectively an approach for exporting protected environments in a way that guarantees that the environment is not accessed in an unauthorized manner.

An implementation of reverse sandboxing in accordance with this invention provides confidentiality and integrity but not availability. It assumes a host with clean hardware and a trusted boot sequence that verifies the host's operating system. In such an implementation, a telecommuter, for example, can run any work-related application within a reverse sandboxed environment without compromising security, and can concurrently use the host for other private purposes such as surfing the web or reading personal email.

An illustrative embodiment of a reverse sandboxing architecture in accordance with this invention is policy-driven, which allows administrators to easily tailor the behavior of the reverse sandbox to match specific needs. It also allows legacy applications to be run unmodified without compromising the execution of the legacy applications.

DETAILED DESCRIPTION

Figure 1:
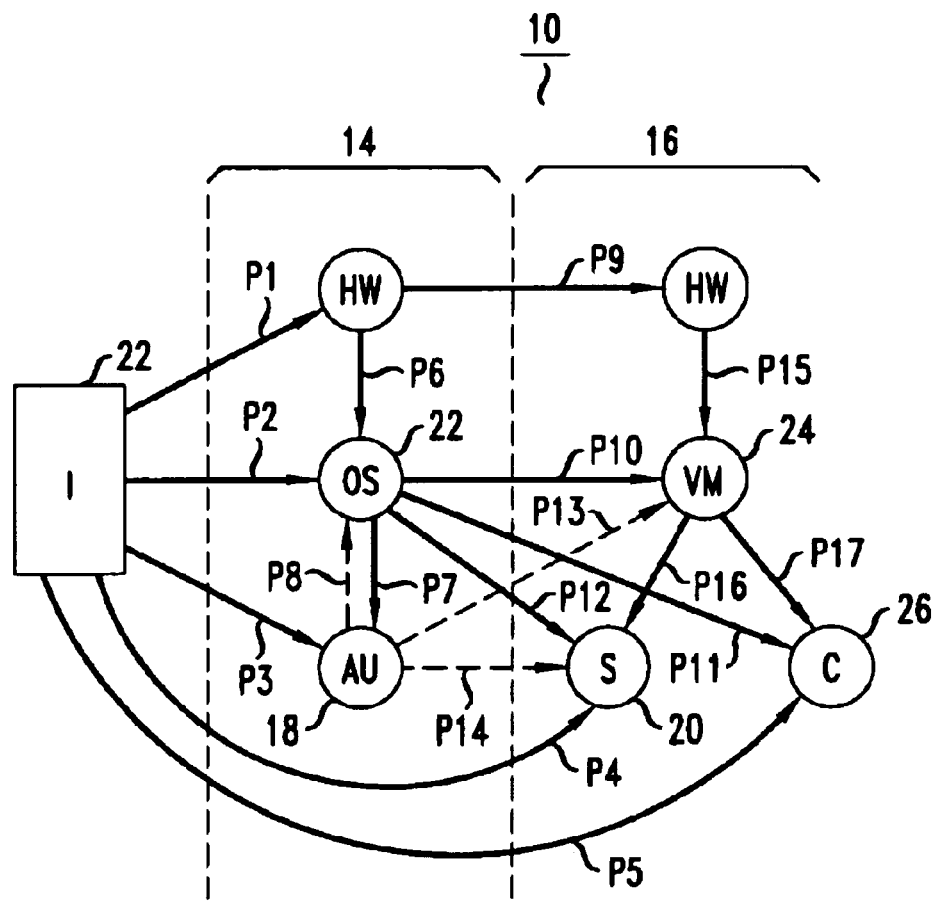
FIG. 1 is a schematic detailing attacker access routes.

The design of any security system is dependent on its underlying trust model—who is trusted, in what way, and to what extent. Broadly speaking, a host has four categories of resources that are used by processes operating in a reverse sandbox: hardware, virtual memory, storage and communications.

The hardware category includes all hardware that operates directly on process instructions or data, in cleartext. It includes the CPU, the physical memory, and input/output devices such as the keyboard and the display, and the like. This category does not include input/output devices such as disks and network adaptors that do not need to be presented with data in cleartext.

The virtual memory category includes all transient memory resources that contain information that is private to a process. In addition to the process's own virtual memory image, this category includes kernel buffers and swap space that are allocated for use by the process.

The storage category includes all forms of long term storage (e.g., disks) that may contain data that is private to a process.

Lastly, the communications category includes all remote communication resources, e.g., communication channels to processes on other hosts in the virtual private network. Interprocess communication is not included in this category because it is typically implemented using kernel memory transfers and, thus, belongs to the virtual memory category.

The security of a host can be breached at three levels: hardware, operating system, and user.

A hardware breach attempts to use compromised hardware or firmware (e.g., the CPU) to leak information from the reverse sandbox or to inject bad information into the reverse sandbox.

An operating system breach modifies the operating system or replaces the operating system with a compromised version. This attack exploits the fact that the operating system has access to the entire virtual memory space of processes. It can thus leak information from the reverse sandbox, or inject bad information into the reverse sandbox.

A user breach involves an attacker that assumes the identity of a legitimate user on the machine.

Note that the above sets up a hierarchy of breaches. In order from the most severe to the least severe, this hierarchy is hardware breach (HW), operating system breach (OS), and user breach (U). This means that a HW breach implies an OS breach, which implies a U breach. This hierarchy can be represented by

HW⇒OS⇒U.

Most operating systems classify users into two categories: administrative users (AU), and other users (OU). In certain operating systems, such as the UNIX operating system and the Windows NT operating system, administrative users have special privileges that allow them to bypass ACL and capability-based protection measures to access resources owned by other processes. For these operating systems, the hierarchy is

HW⇒OS⇒AU⇒OU.

For another class of operating systems such as "Plan 9" from Bell Labs, the administrative user is not allowed to assume the identity of other users or access resources owned by them. Thus, an AU breach in this case does not imply an OU breach. In this case, the hierarchy is

HW⇒OS⇒{AU,OU}.

Finally, for some operating systems such as certain implementations of UNIX, a super-user has the capability to modify the OS and therefore compromise it. This implies that OS=AU in the hierarchy. Therefore, the hierarchy becomes

HW⇒OS⇒AU⇒OU.

The above considerations result in an attack graph 10 as shown in FIG. 1, where the square node represents an attacker 12, the circular nodes in the center represent breaches 14, the circular nodes on the right represent resources 16, and the labeled, directed edges represent paths (P1–P17) by which an attack may proceed. For example, the attacker 12 can use path P3 to become an administrative user 18 on the host and then use path P14 to bypass access control list measures and access storage 20 owned by other users.

Most attack paths, represented by solid edges, are common to all operating systems. Other attack paths, represented by dashed edges, exist only in some operating systems. For example, path P8 exists in operating systems where an AU breach 18 implies an OS breach 22. Path P14 exists in operating systems where an AU breach implies an OU breach. Path P13 exists in operating systems that allow administrative users 18 to read or write the virtual memory 24 of processes owned by other users (OUs).

It may be noted that attack paths P4 and P5 do not require the host to be breached directly at all. The path to communications 26 does not require the host to be breached because the signals flowing can be via an insecure communication path, such as the Internet, and therefore can be tapped outside the host. The path to storage 20 does not require the host to be breached because storage devices can be extracted from the host and examined independently. Given the FIG. 1 attack graph, the job of a reverse sandbox in the context of a virtual private network is to seal off as many paths as possible between the attacker and the resources.

The reverse sandbox disclosed herein provides confidentiality and integrity, but three assumptions are made which should be kept in mind. These are:

1. the hardware is not compromised;
2. the standalone host can be booted securely using a trusted boot sequence that leads to reading a provided read-only program store (existing OSs can be modified to do this); and
3. the memory system is protected against unauthorized access, i.e., no user can read the kernel memory or the memory of a process that it does not own.

An illustrative embodiment of a reverse sandbox architecture in accordance with the present disclosure provides two core mechanisms: a virtual firewall, and a namespace. The virtual firewall controls the flow of information into and out of the reverse sandbox, and in particular, it ensures that any information flowing out of the reverse sandbox is adequately protected using appropriate cryptographic primitives. It also assumes that the information flowing into the reverse sandbox is similarly encrypted. The namespace ensures that processes operate within the protected environment of the reverse sandbox.

In effect, the reverse sandbox acts as a "container" for the processes in it. When a process in the reverse-sandbox makes a service request (e.g., a system call or library call) the request is intercepted and suitably modified. The response to the request, if any, is similarly intercepted and suitably modified. In this way, the reverse sandbox mediates all interactions between the processes within it and all other processes and the resources that exist on the host.

The nature of the security guarantees enforced by the reverse sandbox in its role as a container for processes can vary from one computing environment to another computing environment. Therefore, in accordance with the principles disclosed herein the security guarantees are controlled by a security policy that is specified to the reverse sandbox by, for example, the VPN administrator; in other words, modifiable.

Figure 2:
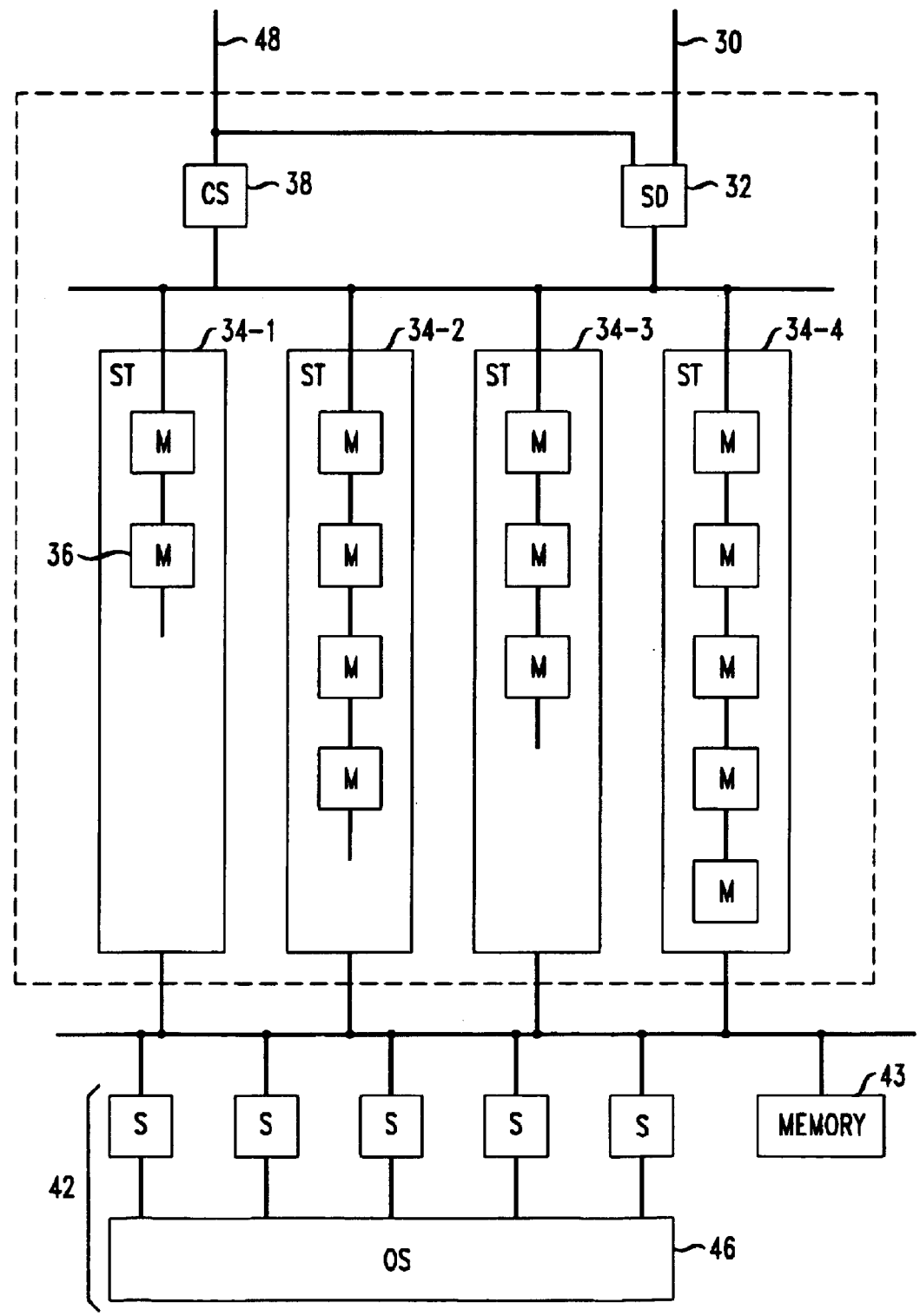
FIG. 2 is a schematic of the architecture of an exemplary embodiment of a reverse sandbox in accordance with the present invention.

FIG. 2 presents an example of a reverse sandbox 40 embodiment, which includes processing stacks 34-*i*, a service director 32, and a compliance supervisor 38. Operationally, an application presents a service request, and this request is applied to service director 32. Service director 32 analyzes the request, classifies the request, and forwards the request to one of the stacks, each of which includes an ordered list of one or more mediation modules 36 that invoke the resources of the underlying system 42, such as memory 43, or programs in a software library 44, while implementing the mediation services provided by reverse sandbox 40. Common instances of mediation modules 36 include those that perform namespace management, encryption, and authentication. For example, a mediation module 36 may encrypt file system access or check executables for possible corruption.

Each type of service request 30 has its own processing stack 34-*i*, which is executed each time that type of service request 30 is made. To illustrate, the FIG. 2 embodiment includes four stacks 34-1, 34-2, 34-3 and 34-4, and each of them includes a number of mediation modules 36. One of the stacks may provide for encrypting files, while another one of the stacks may provide for hashing files and assessing results.

As indicated above, service director 32 intercepts, classifies, and directs each service request 30 to a specific processing stack 34. The classification is a function of the type of service request 30 and its arguments. For example, service requests 30 may be classified based on whether they are filesystem calls, calls to the networking subsystem or calls for process invocation.

Compliance supervisor 38 constructs and modifies processing stacks 34-*i*, as necessary, to ensure compliance with the security policies. In the illustrative embodiment of FIG. 2, the security policy is provided to service director 32 and compliance supervisor 38 via path 48, and thus both participate in the implementation of the security policy and processing stacks 34-*i* carry out that policy.

The FIG. 2 architecture allows the VPN administrator to clearly and simply customize the security policies for different scenarios. The administrator needs to inform the compliance supervisor 38 and the service director 32 about new policies, and the mediation modules 36 that are created in response thereto are placed in the various stacks 34-*i* and carry out those new policies.

It may be noted that commonly used mediation modules 36, such as modules that implement cryptographic operations, can be reused across processing stacks. In addition, independently developed code can be leveraged by creating a wrapper for them and then using them as mediation modules 36.

Operationally, the reverse sandbox has two key phases: startup, during which the reverse sandbox is started using a bootstrapping mechanism; and execution, during which the reverse sandbox allows processes to operate within it.

The main task at startup is to validate the environment on which the reverse sandbox is about to execute. The trust model places trust in both the operating system and the reverse sandbox software. Therefore, validation requires that the executables (i.e., program modules) associated with both these pieces of software be authenticated. More specifically, the operating system needs to be authenticated at boot time, while the reverse sandboxing software needs to be authenticated at any time prior to starting the reverse sandbox application.

One way to accomplish this is for the administrator of the virtual private network to (a) provide a trusted read-only program store such as a floppy disk, or a CD-ROM, that is used for the authentication process, and (b) set the host so that its boot-up begins by reading that trusted program store.

Most personal computers are set to boot-up from the A drive, so a read-only floppy disk would be the easiest to work with. A floppy disk can be made to be "read-only" by physically moving a tab on the disk (or break it), but that is not very secure. A better approach is to create a floppy disk that employs a magnetic material which, in order to write information thereon, requires the application of a much greater magnetic field than conventional floppy disk drives provide. Such a floppy disk cannot be altered with conventional floppy disk drives and, hence, is more trusted. Of course, the host can be alternatively set up to boot-up from the drive that reads CD-ROMs.

The read-only program store includes a small program that is needed to authenticate an operating system, information that is related specifically to the target host, and optionally, the set of programs that are needed to authenticate the reverse sandboxing software.

Figure 3:
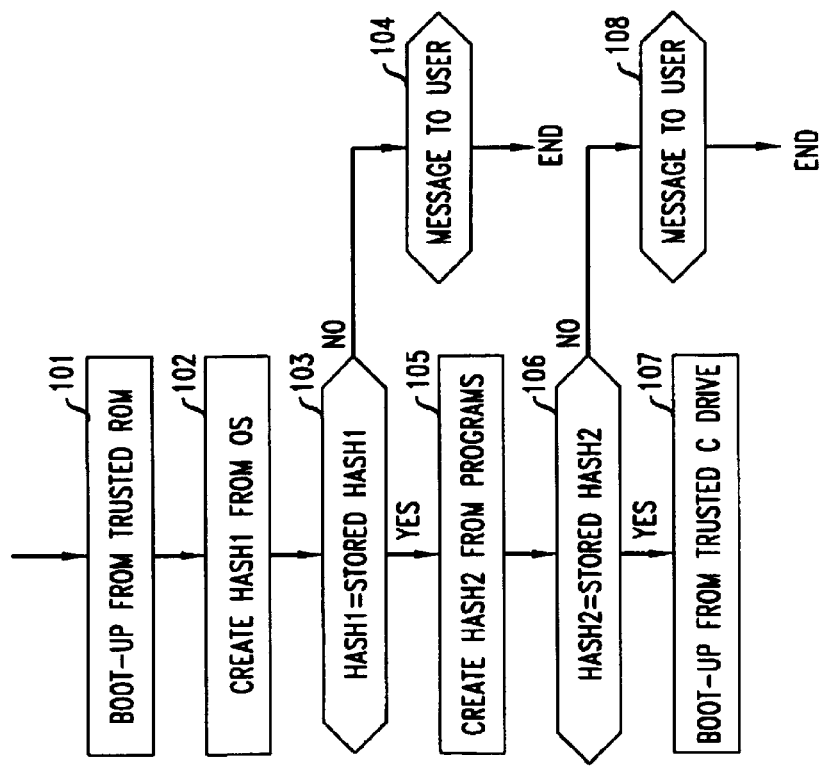
FIG. 3 is a flow chart that outlines an exemplary control routine for authenticating the operating system and the reverse sandbox software.

FIG. 3 depicts the process for authenticating the operating system, followed by the process for authenticating the reverse sandbox software. At step 101 the host is booted from the provided and trusted read-only program store, employing solely its own mini operating system. At step 102 the host's operating system is evaluated by creating a cryptographic hash of the operating system, and at step 103 the created cryptographic hash is compared to the one stored in the read-only program store. If there is a match, it is concluded that the host's operating system has not been tampered with, and control passes to step 105. Otherwise, control passes to step 104, which provides an appropriate message to the host's user, and quits. In step 105 the operating system performs the same authentication process as described above, except that it evaluates the reverse sandboxing software (embodied in elements 38, 32, and 36) by developing a cryptographic hash for those program elements. In step 106 the developed cryptographic hash is compared to one that is stored in the read-only program store. If the comparison determines that the developed cryptographic hash is valid, then control passes to step 107, where the host is rebooted from the host's C drive using the host's normal operating system, and control is passed to the reverse sandbox software. Otherwise, control passes to step 108, which outputs an appropriate message and quits.

It should be realized that the above-described process can be coalesced into a single authentication step, and it can also be separated into two independent processes. In the latter case, of course, the host is booted-up following the authentication of the host's operating system.

It may be observed that the above-described startup seals off attack path P2 shown in FIG. 1 by disallowing an attacker from substituting corrupt versions of the operating system and reverse sandbox software.

Figure 4:
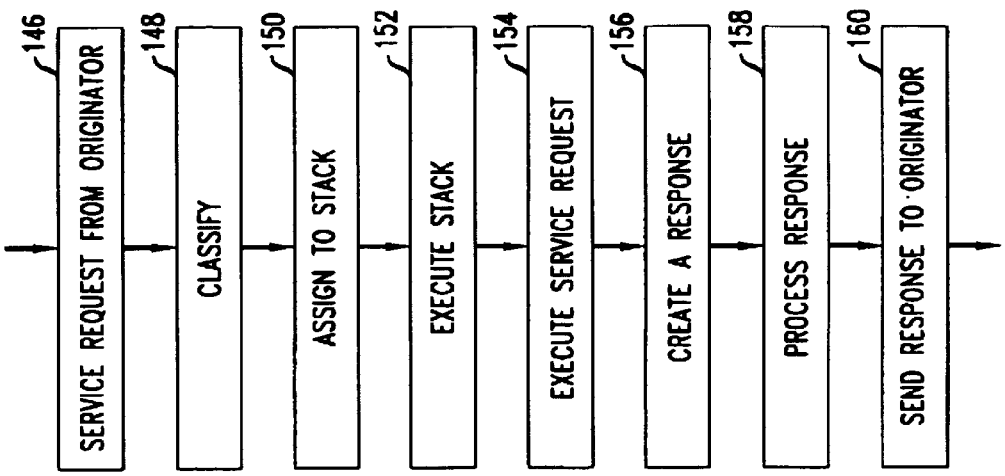
FIG. 4 is a flow chart that outlines an exemplary control routine that executes the reverse sandbox.

FIG. 4 presents a flow chart of a reverse sandbox process in accordance with the principles disclosed herein. At step 146 the process receives a service request and passes control to step 148, where the process classifies the service request. In step 150, the control routine assigns the service request to a processing stack based upon the classification and continues to step 152. In step 152, the control routine executes the assigned processing stack and continues to step 154. In step 154, the operating system executes the service request and continues to step 156. In step 156, a response from the executed service request is received (employing software libraries 44 and operating system 46 of the underlying system 42) and the process continues to step 158. In step 158, the control routine processes the response by executing the assigned processing stack in reverse and continues to step 160. In step 160, the control routine returns the response to the originator of the service request.

In the case of many processing requests, (e.g., getuid( ), gettimeofday( ), etc.) the request is simply passed through to the underlying system without any processing. However, there are at least three broad classes of requests, for which the processing stack is not empty, and those are described below. It may be noted, however, that because processing stacks are defined by the system administrator's security policy, the following does not exhaustively enumerate all possible processing stacks that may be found in any particular host. Rather, the illustrative implementations below describe the common processing mechanisms that might be implemented in accordance with the present invention.

Storage resources of a host (e.g., the file system) are typically protected by an operating system. However, since the use of such resources is long-lived, it is possible for an attacker to mount an off-line attack on the physical media without going through the operating system. In addition, since certain operating systems imply an OS breach in the case of an AU breach, an administrative user may have access to all files.

To counter an off-line attack on the physical media that does not go through the operating system, the processing stack of an illustrative implementation may provide mediation modules that implement a secure file system. This file system automatically encrypts and decrypts data when storing and retrieving the data. In addition, the file system validates the data using authentication codes (e.g., keyed cryptographic hashes) to maintain the integrity of the data. This mechanism (partially) seals off attack paths P4 and P14.

Although most files used by a reverse sandbox can be stored in a secure file system, there are some files, e.g., executables for common software such as editors and web browsers, that are shared with processes outside the reverse sandbox and, therefore, are not stored in a secure file system. A process invocation can be exploited to breach the security of a system by substituting a compromised executable in place of a genuine executable. The compromised executable could then be used to mount a so-called Trojan horse attack once the reverse sandbox executes it. To guard against this threat, an implementation of a reverse sandbox might advantageously have the processing stack authenticate the file before executing it. This involves two tasks: (I) retrieving an authenticator for the file (e.g., a cryptographic hash) from the private network and (2) validating the local file against the authenticator. In practice, the reverse sandbox can cache the authenticators, thereby achieving better performance by obviating the need to retrieve the authenticators from the private network on each execution. Together with the secure file system, this mechanism seals off attack paths P4 and P14.

Remote communication also needs to be secured because the data will transit public networks. To secure remote communication, the processing stack of an illustrative implementation of a reverse sandbox in accordance with the invention implements a secure tunnel for calls that send or receive data to and from the private network. For example, a processing stack for "send" calls provides mediation modules that encrypt the data and compute a message authentication code on the data. Similarly, a processing stack for "receive" calls provides modules that decrypt the data and verify the message authentication code. This mechanism seals off attack path P5.

As mentioned earlier, certain operating systems have features that can lead to operating system-specific attacks as described above. These attack paths are labeled P8, P13, and P14 in FIG. 1. To review, path P8 exists because in certain operating systems an AU breach implies an OS breach. Path P13 exists because in certain operating systems an administrative user is allowed to read from and write to the virtual memory of other processes, and path P14 exists because in certain operating systems an AU breach implies an OS breach.

Path P14 is sealed off through a secured file system as described above. However, paths P8 and P13 require special handling that is specific to the operating system. By way of illustration, the following details an illustrative implementation of a reverse sandbox in the context of the Free BSD v2.2.5 operating system, which is a variant of the 4.4 BSD operating system, and which happens to be a system that is exposed to attack paths P8 and P13. (The 4.4 BSD operating system is described in *The Design and Implementation of the 4.4 BSD Operating System*, by McKusick et al., Addison-Wesley, 1996.)

This illustrative implementation consists of two parts: the reverse sandbox itself as disclosed above, and a small number of modifications to the FreeBSD kernel, described below, to prevent memory peeking and kernel compromise by malicious modification. The user interface to the reverse sandbox is a modified version of a standard shell program.

The core of our embodiment of the FIG. 2 reverse sandbox implementation consists of a modified C library that is dynamically loaded by an application at runtime. Since almost all applications use the dynamically loadable C library to access system resources, we chose to modify the C library to intercept all library and system calls. Once the call has been intercepted by the modified C library, it is classified, and applied to a stack as described above. In this manner, an application may run within the sandbox without making changes to the application executable itself. In this exemplary embodiment, the service director 32 classifies each intercepted call based on whether it is a filesystem related call, a network subsystem related call, a process invocation related call, or none of the above (the latter requires no mediation). This is done by looking at the name of the intercepted call and its parameters. For example, if the intercepted call is the chmod system call, it is classified as a filesystem related call, whereas if the intercepted call is the exec system call, it is classified as a process invocation related call. Correspondingly our exemplary embodiment has three processing stacks—one for each category of calls—and each processing stack consists of a single mediation module that does the required processing for each class of calls.

As indicated above, the reverse sandboxing architecture makes it easy to "plug in" independently written code. This property can be used to leverage existing software when, for example, implementing cryptographic operations. For example, the cryptographic file system (CFS) described in *A cryptographic file system for UNIX*, by M. Blaze, Proceedings of the first ACM Conference on Communications and Computer Security, Fairfax, Va. 1993, which is hereby incorporated by reference, can be used. CFS creates an encrypted file system that can only be accessed after the user has been authenticated using a passphrase. It presents a "virtual" file system on the client host, typically mounted on /crypt (directory crypt, immediately below the root directory), through which encrypted files can be accessed. The actual files are stored in an encrypted format elsewhere in a local (or remote) file system. Any calls to files in the /crypt hierarchy is redirected by the kernel to a user-level CFS daemon that consists of a cryptographic engine and a client that talks to the underlying encrypted file system. The cryptographic engine provides a choice of encryption algorithms. Similarly, our exemplary embodiment uses a conventional method to secure remote communication. To wit, IPSEC, which is described in *IP Authentication Header*, RFC 2402, *IP Encapsulating Security Payload (ESP)*, RFC 2406, and *Security Architecture for the Internet*, RFC 2401, all published by S Kent and R. Atkinson in November 1998, and all hereby incorporated by reference.

The processing stack corresponding to the filesystem related calls includes a a mediation module that implements filesystem encryption by redirecting such calls to the CFS filesystem. More specifically, this mediation module works as follows. If there is any parameter associated with a call that is an absolute or relative pathname, the mediation module transforms it into a pathname in the CFS filesystem. For this purpose, it maintains a one-to-one mapping of normal pathnames to CFS path names. In essence, this mediation module creates a parallel file hierarchy that is wholly contained inside the CFS filesystem and mirrors the structure of the standard, non-encrypted filesystem. For example, consider a user "foo," running Netscape and using the exemplary embodiment of the reverse sandbox. The mediation module maintains a filesystem hierarchy in the CFS filesystem with "/crypt/.foo" as its root (for the user "foo"), where "/crypt" is the root of the CFS filesystem. The filesystem hierarchy in this embodiment mirrors the entire filesystem as seen by the user "foo." Thus, if the Netscape browser attempts to access a file "/tmp/.cache0154," then the mediation module redirects it to the file "/crypt/.foo/tmp/.cache0154." In this fashion, all user interactions with the filesystem are transparently encrypted, and, therefore, protected.

The processing stack corresponding to network related operations includes a mediation module that secures communication using IPSEC, as suggested above. The mediation module intercepts any system call that opens a socket and redirects it to the IPSEC stack in a way that is similar to the filesystem mediation module. Again, network related calls that only use previously opened socket file descriptors as parameters do not need to be intercepted.

Finally, the processing stack corresponding to process invocation implements executable authentication as follows: the authentication mechanism computes a signature of the executable file, XORs the result with the passphrase supplied by the user and computes a signature of the result of the XOR operation. This signature is compared to signature supplied for the executable to determine whether the executable has been modified. The authentication process also detects all the dynamically loadable library modules used by the executable and applies the same procedure to those libraries to ensure that a modification to any of those library modules has not occurred.

The changes to the FreeBSD kernel in our embodiment total less than 20 lines in various parts of the kernel source files. These changes handle the property exhibited by FreeBSD which manifests itself as attack paths P8 and P13 in FIG. 1. In order to describe the modifications, it is first necessary to explain the concept of "securelevel." In this framework, the FreeBSD kernel maintains a variable called "securelevel." A "securelevel" value of "0" means that the kernel is insecure and is the normal mode of operation. A "securelevel" value of "1" ensures that the immutable and append-only A) flags to files cannot be changed (even by the super-user) and the disks corresponding to mounted file systems cannot be opened for writing. Finally, a "securelevel" value of "2" ensures that even unmounted disks cannot be opened for writing. The value of "securelevel" can be incremented only by the super-user and decremented only by the initialization procedure.

The modifications of the exemplary embodiment are implemented within this framework. These modifications take effect only when the "securelevel" in the kernel is "1" or more. Typically, for reverse sandbox operation, the kernel is run with a "securelevel" of "2."

The modifications for the exemplary embodiment fall under two categories:

1) Modifications that prevent processes from accessing and modifying the memory images of other processes and the kernel. These modifications ensure the confidentiality of information and guarantee that the kernel cannot be surreptitiously modified by writing into the kernel memory image.

2) Modifications that prevent kernel compromise by other means, such as downloading modules or rebooting with a modified kernel.

The modifications that prevent unauthorized memory access seal the attack path P13 shown in FIG. 1. On FreeBSD systems, there are multiple ways to access the memory image of a process. The first way is for a process "$P_1$" to attach itself to a process "$P_2$" using the "ptrace" system call or by using a special "ioctl" command on the "procfs" file system. The second way is for process "$P_1$" to use the standard read and write system calls to the "procfs" filesystem to access "$P_2$"'s memory image. The exemplary embodiment has a modified kernel such that whenever a process "$P_1$" attempts to attach to a process "$P_2$," a check is performed to see if "$P_1$" is "$P_2$"'s parent. If not, "$P_1$" is not allowed to attach to "$P_2$." Note that this means that no process but a parent can attach to a process "$P_2$." This ensures that "$P_2$"'s memory image is protected from unauthorized attaches and at the same time, makes debugging using "gdb" like tools possible.

The third way to access the memory image of a process is to read the memory image of a process that has been swapped out to disk. In the FreeBSD kernel, the swap device is a specially designated disk partition that is specified at boot time using the "swapon" command. The swapper process accesses the swap device using a special interface constructed by the "swapon" command. However, the swap device can still be accessed for reads and writes by the super-user as an ordinary block device. The exemplary embodiment comprises a modified kernel that sets an unused bit in the flag field of the virtual node ("vnode") associated with the swap device. When any process attempts to access the swap device using the block device interface, it is possible to detect this by checking the bit in the flag field of the "vnode" for the device. If the requesting process is not the swapper process (process ID 0 in the FreeBSD kernel), such access is denied. In addition to a block device interface, the FreeBSD kernel also provides a character device interface to the swap device called "/dev/drum." The exemplary embodiment comprises a modified kernel that denies access to this device if the requesting process is not the swapper process.

Lastly, the exemplary FreeBSD kernel presents device-like interfaces to the physical memory on the machine ("/dev/mem") and the kernel virtual memory ("/dev/kmem"). The kernel modifications of the exemplary embodiment prevent access to all of these devices by resetting the appropriate read/write/execute permissions on these devices.

These modifications for the exemplary embodiment prevent unauthorized access and modification of the memory image of any process (or the kernel). Among other things, this ensures that the kernel buffers are protected. Since IPC data and data for communication between a user process and I/O devices (such as the framebuffer or the keyboard) is stored in kernel buffers, protecting kernel buffers in this fashion guarantees that such internal communication is also protected. In other words, it is not possible for an attacker to leak information to a process outside the reverse sandbox using IPC or a similar local communication mechanism. Moreover, since access to "/dev/mem" and "/dev/kmem" is sealed, it is not possible for attackers to use well-known bugs in the X-Windows system that exploit these security holes to leak information.

The second category of kernel modifications of the embodiment are designed to prevent kernel compromise only. This seals the attack path P8 shown in FIG. 1. On FreeBSD systems, it is possible for the super-user to download a special kernel module into a running kernel using the "lkm" (loadable kernel module) facility. This can be used by a malicious super-user to compromise the kernel by downloading a module that gathers information which is private to a running process. The exemplary embodiment has a modified "lkm" facility such that any attempt to download a new module to a running kernel results in a check. The check verifies that the requester is physically logged on to the console and is the super-user (by checking the user ID). This eliminates the possibility of intruders remotely breaking in to a computer and downloading modules to compromise the kernel (since console log in is required for this). These measures, in combination with the fact that the kernel is authenticated at boot time, implies that it is not possible for an attacker to install compromised drivers that read the frame buffer or keystrokes and, thereby, leak private information from the reverse sandbox. Similarly, keystrokes cannot be intercepted and used to inject bad information into the reverse sandbox.

Before the reverse sandbox of the exemplary embodiment can run on a standalone host, it needs to be installed on the host. The system administrator for the private network (that the standalone host is supposed to connect to) supplies the user of the reverse sandbox with some read-only storage media (such as write-protected floppy or CD-ROM) that contains dynamically linked versions of the small fraction of system utilities that are statically linked in the FreeBSD distribution. Note that the problem of statically linked utilities is an artifact of legacy systems like FreeBSD. On newer systems such as Windows NT, applications are always dynamically linked. Furthermore, even on FreeBSD, most applications and utilities (such as emacs and Netscape) are also dynamically linked and therefore do not need to be recompiled.

The storage media also contains a file with encrypted signatures for the following: a reverse sandbox executable, a clean FreeBSD kernel, and each of the application programs that the user expects to run using the virtual machine. These signatures are computed using copies of the executables that are known to be clean and encrypted using a key supplied by the user beforehand. As described above, these signatures are used to detect whether an intruder has tampered with an executable. Note that the exemplary embodiment uses a boot strapping procedure that uses a read-only media that verifies the operating system at boot time using an encrypted hash. As explained above, a more secure boot strapping procedure that makes fewer assumptions, such as AEGIS, could be used to provide improved security. See A. Arbaugh et al, "A Secure and reliable bootstrap architecture," *Proceedings of* 1997 *IEEE Symposium on Security and Privacy*, Oakland, Calif., May 1997.

The user interface of the exemplary embodiment of the reverse sandbox is a modified version of the standard shell program that we call "secsh" (secure shell). When the user executes the "secsh" command, the shell prompts for the user's passphrase. Once the user is authenticated, the shell then uses CFS to mount the virtual (clear text) interface to the encrypted file system used by the reverse sandbox. It then sets the environment variable LD LIBRARY PATH such that the modified C library is loaded at runtime instead of the standard C library. Finally, it changes the working directory to the root of the encrypted file system. Any library call made by a process started by the secure shell is intercepted by the modified C library and subjected to the security measures described earlier.

Advantageously, each reverse sandbox user has a different password key. This key is used for authenticating the user, as well as encrypting all files and communication inside the reverse sandbox. The key itself is encrypted using a one-way hash (as in the case of UNIX passwords) and stored in a special file in the user's home directory on the standalone host. One may note that no mechanisms for securely distributing keys over remote networks is required here since all transactions requiring the user-specific key orginate from the standalone host where the key is stored.

While this invention has been described with the specific embodiments outlined above, many alternatives, modifications, and variations are and will be apparent to those skilled in the art. Accordingly, the preferred embodiments described above are illustrative and not limiting. Various changes may be made without departing from the spirit and scope of the invention.

What is claimed is:

1. A system including a processor, and a collection of resources interacting with said processor, said resources including at least a memory and a library of executable modules that are supported by an operating system, the improvement comprising:

a plurality of processing stacks for dividing the system's computing environment into an unprotected portion and a protected portion, where the protected portion is protected from interloping processes in accord with an administratively specified schema, by mediating interactions between executing processes within said system and said resources, each of said stacks including a predefined set of at least one mediation module that processes a request by at least one of said executing processes, which request is to be applied a resource of said collection of resources to form a signal, if appropriate pursuant to and in accord with such schema, that is applied to said resource of said collection of resources; and a service director module that intercepts requests of different types that are directed to said resources, classifies said requests in accordance with said types of said requests, each different one of said resources being responsive to requests of a different type, and directs said requests to different ones of said processing stacks, based on said classifying.

2. The system of claim 1 wherein said at least one resource to which said signal is applied develops an output signal that is accepted by said at least one mediation modules.

3. The system of claim 1, wherein at least one processing stack of said plurality of processing stacks comprises an ordered sequence of at least two mediation modules.

4. The system of claim 1, wherein said service director receives a request from an application that is active on said system and applies said request to said at least one mediation module.

5. The system of claim 4, wherein said mediation module receives a return signal from said at least one resource of said collection of resources, processes said return signal to form a processed ret signal, and sends said processed return signal to said application.

6. The system of claim 5 wherein said at least one resource of said collection of resources sends said processed return signal via said service director.

7. The system of claim 1, wherein said at least one mediation module is based upon a chosen security policy.

8. The system of claim 1, wherein said at least one mediation module in said processing stack performs encryption.

9. The system of claim 1, wherein said mediation module is a namespace manager.

10. The system of claim 1, wherein said mediation module performs authentication.

11. The system of claim 1 wherein said mediation module is a secure file system.

12. The system of claim 1, wherein said service director includes:

a service request classifier that classifies a received service request; and a processing stack selector that selects a processing stack based upon said classification, and communicates said service request to said selected processing stack.

13. The system of claim 1, wherein said service director includes a service request classifier that classifies a service request based upon the type of service request and arguments of the service request.

14. The system of claim 1 further comprising a connection to a network.

15. The system of claim 14 wherein said connection is secure.

16. The system of claim 14, wherein said network is a virtual private network.

17. The system of claim 16 wherein said connection is secured.

18. The system of claim 17 wherein said connection is secured through encryption.

19. The system of claim 1 further comprising a compliance supervisor that is coupled to said processing stacks, and to said service director, and is adapted for receiving security policy information from outside said system.

20. The system of claim 19, wherein said compliance supervisor receives said security policy information from a virtual private network.

21. The system of claim 19, wherein said compliance supervisor includes a processing stack modifier that modifies said processing stack based upon a received security policy.

22. The system of claim 19, wherein said compliance supervisor includes a processing stack creator that creates a processing stack based upon said security policy.

23. The system of claim 1, wherein said at least one mediation module includes at least one authentication code retriever that retrieves an authentication code and a validation system that validates said service request against said authentication code.

24. The system of claim 1 wherein said operating system includes means to prevent implication of an operating system breach from an administrative user breach.

25. The system of claim 1 wherein said service director and said processing stacks are embedded in a loadable library of C language executable modules.

26. The system of claim 1 further comprising a read-only program store that is read by said system upon boot-up.

27. A system including a processor, and a collection of resources interacting with said processor, said resources including at least a memory and a library of executable modules that are supported by an operating system, the improvement comprising:
- a plurality of processing stacks, each including a pre-defined set of at least one mediation module that processes an applied signal to form a signals that is applied to said at least one resource of said collection of resources;
- a service director module that intercepts requests of different types that are directed to said resources, classifies said requests in accordance with said types of said requests, each different one of said resources being responsive to requests of a different type, and directs said requests to different ones of said processing stacks, based on said classifying; and
- a read-only program store that is read by said system upon boot-up;
- wherein said system includes an operating system, and said read-only program store contains a program module for verifying the operating system, and authentication program modules for authenticating software present in said memory of said system.

28. The system of claim 27 where said software that is authenticated by said authentication program modules includes software that forms an operating system of said system.

29. The system of claim 28 where said authentication program modules develop a cryptographic hash of software to be authenticated.

30. A storage medium that stores a control routine for use by a system to assure security of said system, the control routine including instructions that, when said storage medium is coupled to said system, the instructions are adapted to:

boot said system with an authenticated operating system (AOS) located on said storage medium;

verifying an operating system of said system that is resident on said system (VOS);

transferring control of said system from said AOS to said VOS when said VOS is verified, said transfer being sufficiently effective to allow intended operation of said system with said storage medium being decoupled from said system.

31. The storage medium of claim 30, wherein said instructions, when they boot said system, verify said operating system of said system by reading executable modules of said operating system of said system, determining a cryptographic hash for said executable modules, and comparing said cryptographic hash to a known value.

32. The storage medium of claim 30 where said control routine further includes steps for;

verifying software that implements a reverse sandbox on said system; and transferring control of said standalone host to said reverse sandboxing software.

33. The storage medium of claim 30 further comprising reverse sandbox software to be installed in said system.

34. The storage medium of claim 33 wherein said reverse sandbox software includes a service director, a compliance supervisor, and a processing stack including at least one mediation module.

* * * * *